Patented Apr. 5, 1932

1,852,044

UNITED STATES PATENT OFFICE

JOSEPH E. DRAPEAU, JR., OF BRONX, NEW YORK, ASSIGNOR TO NICHOLS COPPER COMPANY, OF NEW YORK, N. Y., A CORPORATION OF NEW YORK

ELIMINATION OF CHLORINE FROM SOLUTIONS

No Drawing.   Application filed November 25, 1929.   Serial No. 409,767.

This invention relates to the elimination of chlorine from solutions. It is more particularly directed to elimination of chlorine formed by the reaction for the production of zinc sulfate. The elimination of chlorine from water solutions containing it, usually in the form of chloride, so that the resulting solution contains only a trace of chlorine, for example, .04% or less, is desirable and necessary in certain operations. For example, a solution of zinc sulfate to be used in the manufacture of lithopone is substantially useless and unsaleable if it contains 0.8% of chlorine, present as chlorides. A solution of zinc sulfate containing .04% or less of chlorine as chlorides, however, is satisfactory for this purpose. The reason for the undesirability of solutions containing the higher contents of chlorine as chlorides for this purpose is that the lithopone manufactured from this material deteriorates rapidly when exposed to direct sunlight and becomes discolored.

One of the objects of this invention accordingly is to provide a simple efficient process for the elimination of chlorine from solutions so that the resulting chlorine content may be at least as low as .04%. Another object of the invention is to provide an effective process using inexpensive reagents which may be used over and over again for preparing zinc sulfate from solutions containing chlorine, suitable for lithopone manufacture.

The invention comprises the novel products as well as the novel processes and steps of processes according to which such products are manufactured, the specific embodiments of which are described hereinafter by way of example and in accordance with which I now prefer to practice the invention.

By way of example, I describe below the process for the elimination of chlorine from solutions obtained during the refining of secondary metals containing zinc such as brass, solder and the like. It will be understood, however, that I do not desire to limit myself to the process as thus carried out. In obtaining such solutions in accordance with my invention, secondary metals containing zinc are mixed together and sometimes combined with ores containing zinc. This combination is placed in a blast furnace along with the fuel and other ingredients employed in blasting and a matte is obtained which may be recovered in the usual way while a fume is given off which is collected in a "bag" house. The matte goes to convertors where it is mixed with a large amount of secondary metal and blown. From the convertor copper is obtained which then passes to electrolytic refining operations and a fume obtained from the convertor is collected in a similar manner to that described above. Both fumes, namely that collected from the blast furnace and that from the furnace, contain zinc, zinc oxide, zinc sulfate, lead oxide, copper oxide, copper, tin and silver. These fumes are combined with sulfuric acid to produce a zinc liquid which with subsequent purification can be used for lithopone manufacture. This solution has ordinarily a gravity of about 36° Bé. being substantially saturated, and contains about 8 grams per liter (0.6%) of chlorine as zinc chloride.

For lithopone manufacture it is important as pointed out that the content of chlorine be 0.4 grams per liter (.03% or less) of chlorine.

According to the present invention for the elimination of chlorine from zinc sulfate solution, the following reactions may be secured in the presence of copper sulfate which may be present at least in part in the leachings of the fume obtained above, or may be added to the zinc liquor, whereby an equilibrium reaction occurs:

(1) 

The above is a reversible reaction, the direction of the reaction being dependable upon the concentration of the reaction products.

I have found that the above reaction may be directed to the right, in cold or warm solutions, to the extent of a complete or nearly complete elimination of the chlorine in the presence of finely divided copper according to the following reaction:

(2) $ZnCl_2 + CuSO_4 \rightarrow CuCl_2 + Cu \rightarrow Cu_2Cl_2$

In order to carry out the above reaction (2) I add twice the theoretical equivalent of copper, for example as $CuSO_4$, demanded by this equation, or make up the copper sulfate content of the leachings so that twice the theoretical equivalent of copper is present. To the solution so prepared, I add a considerable excess of finely divided copper over that demanded by Equation (2). I may use as much as 10 times the theoretical amount demanded. The finely divided copper which I prefer to employ is such as produced electrolytically at high current densities, although as described below I may also use the copper obtained by the conversion of the cuprous chloride.

After addition of the finely divided copper, reaction (2) takes place very rapidly and is complete without warming the solution in less than five minutes. At the end of that time, a precipitate of cuprous chloride is formed which is insoluble and is removed by filtration. After filtration a further quantity of finely divided copper may be added and any cuprous chloride precipitating again filtered off and this treatment may be repeated several times until the final last traces of chlorine are removed and substantially no chlorine remains.

After the cuprous chloride has been filtered off, there remains a solution which consists of zinc sulfate, copper sulfate and some other metallic sulfates which is then ready for further processing to prepare the zinc sulfate for treatment with barium sulfide to produce lithopone. The resultant solution contains copper sulfate in considerable quantity depending upon the amount added for the purposes of the reaction (2) above. This excess of copper sulfate is desirable for under ordinary circumstances the solution at this stage contains nickel and the copper sulfate aids in the separation of nickel which must be carried out before the solution is employed in the manufacture of lithopone.

The copper which has been converted into cuprous chloride may be changed back into finely divided copper in accordance with the following reaction:

(3) $Cu_2Cl_2 + Zn$ (balls, scrap, etc.) $\rightarrow 2Cu + ZnCl_2$

The water soluble zinc chloride may be washed from the fine copper precipitate on a suitable filter. The copper thus obtained may be used in the reaction above in place of the electrolytic copper there referred to. It is important to employ finely divided copper having the characteristics of such copper obtained in either of the ways herein mentioned, in order to insure the elimination of chlorine from solutions of low chlorine concentrations, say 0.3% or less.

Although I have described the invention as applicable to the treatment of zinc sulfate solutions for the elimination of chlorine in the form of zinc chloride, it will be obvious that the invention is not restricted to the treatment of zinc chloride in this manner but that various metallic chlorides may be treated by copper salts adapted to form cupric chloride by treatment with copper preferably as electrolytic copper for the production of insoluble cuprous chloride which shall be removed.

The process described is a simple and efficient one for eliminating chlorine from solutions. It is particularly effective in connection with the preparation of zinc sulfate solutions to be used in the production of lithopone and the solutions resulting may be used in lithopone manufacture without danger through the action of chlorine, of discoloration of the product when exposed to sunlight.

While I have described my improvements in great detail and with respect to certain preferred embodiments thereof, I do not desire to be limited to such details or embodiments since many changes and modifications may be made and the invention embodied in widely different forms without departing from the spirit and scope thereof in its broader aspects. Hence I desire to cover all equivalents and all modifications and forms coming within the language or scope of any one or more of the appended claims.

What I claim as new and desire to secure by Letters Patent is:

1. A process for eliminating chlorine from solution which comprises converting zinc chloride with copper sulfate to cupric chloride and zinc sulfate, adding copper powder and converting the cupric chloride into insoluble cuprous chloride.

2. A process for eliminating chlorine from solutions containing zinc sulfate and zinc chloride, which comprises reacting copper sulfate with the zinc chloride in sufficient quantity to convert substantially all of the chloride to cupric chloride, adding finely divided copper powder and converting substantially all of the cupric chloride to insoluble cuprous chloride and leaving a soluble chloride content of about 0.3% or less.

3. A process for eliminating chlorine from solutions which comprises preparing a solution containing zinc chloride, copper sulfate and finely divided copper so that a considerable excess of copper sulfate over that required to react with the zinc chloride, and a considerable excess of finely divided copper over that required to act with the cupric chloride formed is present, and allowing insoluble cuprous chloride to form.

4. A process for eliminating chlorine from solutions which comprises preparing a solution containing zinc chloride, copper sulfate and finely divided copper so that a considerable excess of copper sulfate over that required to react with the zinc chloride, and a considerable excess of finely divided copper over that required to act with the cupric chloride formed is present, and removing insoluble copper chloride from the solution.

5. A process for eliminating chlorine from solutions which comprises adjusting the copper sulfate content of a solution containing zinc chloride so that about twice the necessary quantity of copper sulfate to react with the zinc chloride is present, adding a large excess of finely divided electrolytically deposited copper to the solution, allowing the zinc chloride to change to sulfate and the copper to change to cupric chloride and then to insoluble cuprous chloride, and filtering off the insoluble cupric chloride.

6. A process according to claim 1 in which the cuprous chloride is removed and is reconverted into copper powder by treatment with metallic zinc, and reacting said copper powder with a further quantity of cupric chloride.

7. A solution for lithopone manufacture having zinc sulfate and copper sulfate therein and containing zinc or other chloride therein but having a chlorine content of less than 0.4 grams per liter, the content of copper being in excess of the equivalent chlorine content of the solution.

In testimony whereof I have signed my name to this specification.

JOSEPH E. DRAPEAU, Jr.